US 6,669,753 B1

(12) United States Patent
Chambers et al.

(10) Patent No.: US 6,669,753 B1
(45) Date of Patent: Dec. 30, 2003

(54) METHOD AND COMPOSITION FOR DESENSITIZING THE EXPLOSIVE PERFORMANCE OF COMMERCIALLY AVAILABLE FERTILIZERS

(75) Inventors: George P. Chambers, La Plata, MD (US); William H. Wilson, Niceville, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 296 days.

(21) Appl. No.: 09/971,895

(22) Filed: Oct. 9, 2001

(51) Int. Cl.⁷ .................................................. C05C 1/00
(52) U.S. Cl. ................................. 71/59; 71/61; 149/46; 149/61
(58) Field of Search ...................... 71/61, 59; 149/46, 149/61

(56) References Cited

U.S. PATENT DOCUMENTS

| 3,773,573 A | | 11/1973 | Slykhouse | 149/21 |
| 3,794,534 A | * | 2/1974 | Chandler | 149/2 |
| 3,837,937 A | * | 9/1974 | Fox et al. | 149/4 |
| 4,124,368 A | | 11/1978 | Boyars | 71/59 |
| 4,207,126 A | | 6/1980 | Ekman | 149/109.6 |
| 4,637,849 A | | 1/1987 | Harris | 149/43 |
| 4,780,156 A | | 10/1988 | Sheeran et al. | 149/21 |
| 4,820,361 A | | 4/1989 | McKenzie et al. | 149/2 |
| 4,872,929 A | * | 10/1989 | Mullay | 149/46 |
| 5,099,763 A | * | 3/1992 | Coursen et al. | 102/313 |
| 5,470,407 A | | 11/1995 | Griffith et al. | 149/109.6 |
| 5,540,793 A | | 7/1996 | Bals et al. | 149/2 |

FOREIGN PATENT DOCUMENTS

ZA        9401165 A   *  11/1994

* cited by examiner

Primary Examiner—Chhaya Sayala
(74) Attorney, Agent, or Firm—Mark Homer

(57) ABSTRACT

A method for desensitizing explosives illicitly manufactured from commercial fertilizers, preferably ammonium nitrate. Ammonium nitrate prills are impregnated with microballoons which carry a desensitizing agent, preferably water. The microballoons are sufficiently small that they can be incorporated into the prills where they are not easily separated. Should the modified ammonium nitrate be used as a starting material for the manufacture of ANFO, the resulting ANFO exhibits a diminished explosive potential. The microballoons release their contents in response to a prompt shock wave which passes through the ANFO. The released water quenches the explosive reactions in AN/fuel compositions and curtails the explosive performance of the ANFO. Further, the microballoons are a benign additive having no adverse impact on the fertilizer itself, the plant material or the environment if it is instead used for its intended purpose as a fertilizer.

20 Claims, 5 Drawing Sheets

Table I. Microballoon Samples

| Sample | Active Component | % Active Content | Size Range(μm) |
|---|---|---|---|
| SP378-271-8-1 | Water | 48 | <200 |
| SP378-271-8-2 | Water | 48 | <100 |
| SP381-337-8 | Water | 83 | 380-770 |
| SP383-337-8 | Water | 85 | 280-700 |
| SP380-337-8 | Water | 82 | 300-740 |
| RD344-224-8-1 | Urea | 82 | <150 |
| RD346-252-8-1 | Urea | 87 | 200-300 |
| RD346-252-8-2 | Urea | 87 | <200 |

FIG. 1

Table II. ANFO Work in Closed Bomb

| Shot No. | Description | Explosive Weight (g) | b (kpsi) | m (kpsi) | P(t) (kpsi) | P-Pdet (kpsi) | Norm Weight (g) | Pnorm (kpsi) |
|---|---|---|---|---|---|---|---|---|
| At 7ms, 4.5ms After Firing | | | | | | | | |
| CB-13a | Detonator | 0 | 3.3823 | 0.033734 | 8.15 | — | — | — |
| CB-14 | ANFO | 349.7 | 6.1534 | 0.00309 | 5.69 | 2.54 | 1.17 | 2.18 |
| CB-15 | 10% SP381-337-8 | 277 | 5.655 | 0.098571 | 5.21 | 2.06 | 0.92 | 2.23 |
| CB-16 | 20% SP381-337-8 | 247.7 | 4.7158 | 0.043369 | 5.62 | 1.37 | 0.83 | 1.66 |
| CB-17 | 20% SP378-271-8-2 | 226 | 4.631 | 0.044558 | 4.43 | 1.28 | 0.75 | 1.70 |
| CB-18 | 20% RD344-224-8-1 (U) | 297.8 | 6.4265 | 0.094656 | 6.00 | 2.65 | 0.99 | 2.87 |
| CB-19 | 20% SP378-271-8-2 | 228 | 4.7335 | 0.037886 | 4.56 | 1.41 | 0.76 | 1.86 |
| CB-20 | 20% SP383-337-8 | 242.3 | 4.9995 | 0.2286 | 5.56 | 0.51 | 0.81 | 1.00 |
| CB-21 | 12% SP383-337-8 | 268.8 | 5.7323 | 0.078514 | 5.44 | 2.29 | 0.90 | 2.55 |
| CB-22 | 20% SP380-337-8 | 237.5 | 3.9397 | 0.11237 | 2.48 | 0.33 | 0.79 | 0.42 |
| At 6ms, 5.5ms After Firing | | | | | | | | |
| CB-13a | Detonator | 0 | 3.3823 | 0.033734 | 3.12 | — | — | — |
| CB-14 | ANFO | 349.7 | 6.1534 | 0.00309 | 5.59 | 2.47 | 1.17 | 2.12 |
| CB-15 | 10% SP381-337-8 | 277 | 5.655 | 0.098571 | 5.11 | 2.80 | 0.92 | 2.16 |
| CB-16 | 20% SP381-337-8 | 247.7 | 4.7158 | 0.043369 | 4.48 | 1.36 | 0.83 | 1.56 |
| CB-17 | 20% SP376-271-8-2 | 226 | 4.631 | 0.044558 | 4.39 | 1.27 | 0.75 | 1.58 |
| CB-18 | 20% RD344-224-8-? | 297.8 | 6.4265 | 0.094656 | 5.91 | 2.79 | 0.99 | 2.31 |
| CB-19 | 20% SP376-271-8-2 | 228 | 4.7335 | 0.037886 | 4.53 | 1.41 | 0.76 | 1.35 |
| CB-20 | 20% SP385-337-8 | 242.3 | 4.9995 | 0.2286 | 3.73 | 0.82 | 0.81 | 0.76 |
| CB-21 | 12% SP383-337-8 | 268.8 | 5.7323 | 0.078514 | 5.36 | 2.24 | 0.90 | 2.50 |
| CB-22 | 20% SP380-337-8 | 237.5 | 3.9397 | 0.11237 | 3.37 | 0.25 | 0.79 | 0.32 |

FIG. 4

METHOD AND COMPOSITION FOR DESENSITIZING THE EXPLOSIVE PERFORMANCE OF COMMERCIALLY AVAILABLE FERTILIZERS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates to a method for reducing the detonation potential of explosives manufactured from commercially available sources of inorganic oxidizing salts, such as commercial fertilizers.

2. Description of the Background

It is generally known that explosive devices can be manufactured from commercial grade fertilizers. For example, the explosive ANFO is a stoichiometrically balanced mixture of approximately 94% ammonium nitrate and 6% fuel oil or kerosene. ANFO is a high order explosive capable of detonation in response to a shockwave that passes through a block of the high explosive material. The shockwave breaks apart the molecular bonds between the atoms of the substance leaving mostly explosive gasses.

There are more than 800 different commercially available ANFO preparations. One of the more common mixtures uses "prills" or pellets of ammonium nitrate mixed with diesel fuel to form a semi-liquid substance. A petroleum based oil such as kerosene fuel oils, lubricating oils or crude oil, or nitro-methane is sprayed onto the prilled ammonium nitrate in a mixer. The porous cavities of the prills absorb the fuel oil. Crosslinkers and pH buffers may be added and the mixture is blended to yield a uniform composition.

Some 95% of all commercial explosives work done in the U.S. for mining and commercial blasting uses specially prepared mixtures of ANFO. Commercially prepared ANFO is ideal not only for its destructive potential but also for its relative safety. It performs comparably to ammonium dynamite, but is so stable that spontaneous explosion is unlikely, and the material can be safely manufactured, stored, transported, and used.

To explode the ANFO, commercial explosive experts use a device called a detonator, containing a small amount of a highly explosive material, and a powerful booster charge that will create enough of a shock wave to set off the compound. A special type of detonator called a blasting cap is most frequently used. Common boosters include dynamite, water gel explosives, Dupont Corporation's Detaprime cast boosters, and Atlas Powder Company's Power Prime cast explosive.

Unfortunately, the widespread availability of ammonium nitrate has encouraged illicit production of ANFO for terrorist activity. For example, the bomb that destroyed the Alfred P. Murrah Federal Building in Oklahoma City on Apr. 19, 1995, the most destructive act of terrorism ever on American soil, was an ANFO explosive device. The attack of the USS Cole naval destroyer on Oct. 12, 2000 in the port of Aden, Yemen is supposed to have been carried out with an ANFO explosive device. Ammonium nitrate is widely available in the United States which produces an estimated 14 billion pounds of fertilizer grade ammonium nitrate each year. As long as detonable ammonium nitrate is readily available, the threat of terrorist misuse of the explosive will persist. Fertilizer grade ammonium nitrate is not as pure a preparation as the specially prepared ANFO for commercial blasting. Commercial fertilizer products do not work as well as porous ammonium nitrate prills, because fertilizers are coated with anti-caking agents, additives, and various materials meant to seal them from moisture, which keep the oil from being absorbed. However, information is available in books and on the Internet teaching treatments to convert commercial fertilizer to a functional starting material for an ANFO explosive device.

In the past, a variety of additives have been proposed which would desensitize ammonium nitrate formulations to detonation or severely curtail their explosive performance. However, many additives that have worked well in small scale tests either did not work well in large scale tests, were easily separated, or were environmentally hazardous. For example, water is known to be an ANFO desensitizer when it is present at a concentration of approximately 10% by weight. However, it is a simple matter for terrorists to dry the ammonium nitrate prior to mixing it with fuel oil.

Other efforts to desensitize ammonium nitrate have been directed to the explosive potential of the compound itself rather than ANFO. For example, U.S. Pat. No. 4,124,368 to Boyars discloses a method for reducing the accidental detonation of commercially produced mass quantities of ammonium nitrate by substituting up to 50% by weight of a solid solution of potassium nitrate in form III ammonium nitrate. The concentration of potassium nitrate reduces the probability of adverse phase changes in the ammonium nitrate, and consequently reduces the danger of explosion. Unfortunately, the concentration of potassium nitrate alters the composition of the fertilizer, increasing the potash concentration and decreasing the nitrogen yield. Importantly, while the method may stabilize large masses of ammonium nitrate by reducing phase changes in the ammonium nitrate, it is unclear what effect the potassium nitrate has on the detonation potential of the remaining ammonium nitrate if fuel oil were added.

Accordingly, it would be advantageous to provide a method for desensitizing or severely curtailing the explosive performance of fertilizers illicitly used in the manufacture of explosives. It would further be advantageous to provide a method which would have a minimal environmental impact when the product is used for its intended purpose as a fertilizer. An additive which imparts these properties must be undetectable or difficult to separate from the fertilizer, and able to withstand dessication, elevated temperatures, and pressure.

SUMMARY OF THE INVENTION

It is, therefore, an object of the present invention to provide a method for desensitizing the detonation potential of ANFO manufactured from fertilizer grade ammonium nitrate.

It is another object of the present invention to incorporate a desensitizing agent in fertilizer grade ammonium nitrate which is difficult to separate from the ammonium nitrate prills.

It is still further an object of the present invention to incorporate a desensitizing agent in fertilizer grade ammonium nitrate which is environmentally benign when the ammonium nitrate is released for its intended purpose as a fertilizer.

According to the present invention, the above-described and other objects are accomplished by adding an encapsulated suppressant to ammonium nitrate prills. The suppressant desensitizes the detonation potential of ANFO manufactured from the modified ammonium nitrate. Shock waves which pass through the ANFO in response to an initiating device cause the suppressant to be released, desensitizing the ANFO and reducing or entirely eliminating the explosive performance of the ANFO. The encapsulated suppressant is environmentally benign, and is sufficiently small that it can be incorporated into ammonium nitrate prills where it is not easily separated.

BRIEF DESCRIPTION OF THE DRAWINGS

FIG. 1 is a table listing of exemplary microballoons and their design parameters.

FIG. 4 graphically illustrates the results of closed bomb testing of candidate ammonium nitrate formulations.

DETAILED DESCRIPTION OF THE PREFERRED EMBODIMENTS

Figure 2:
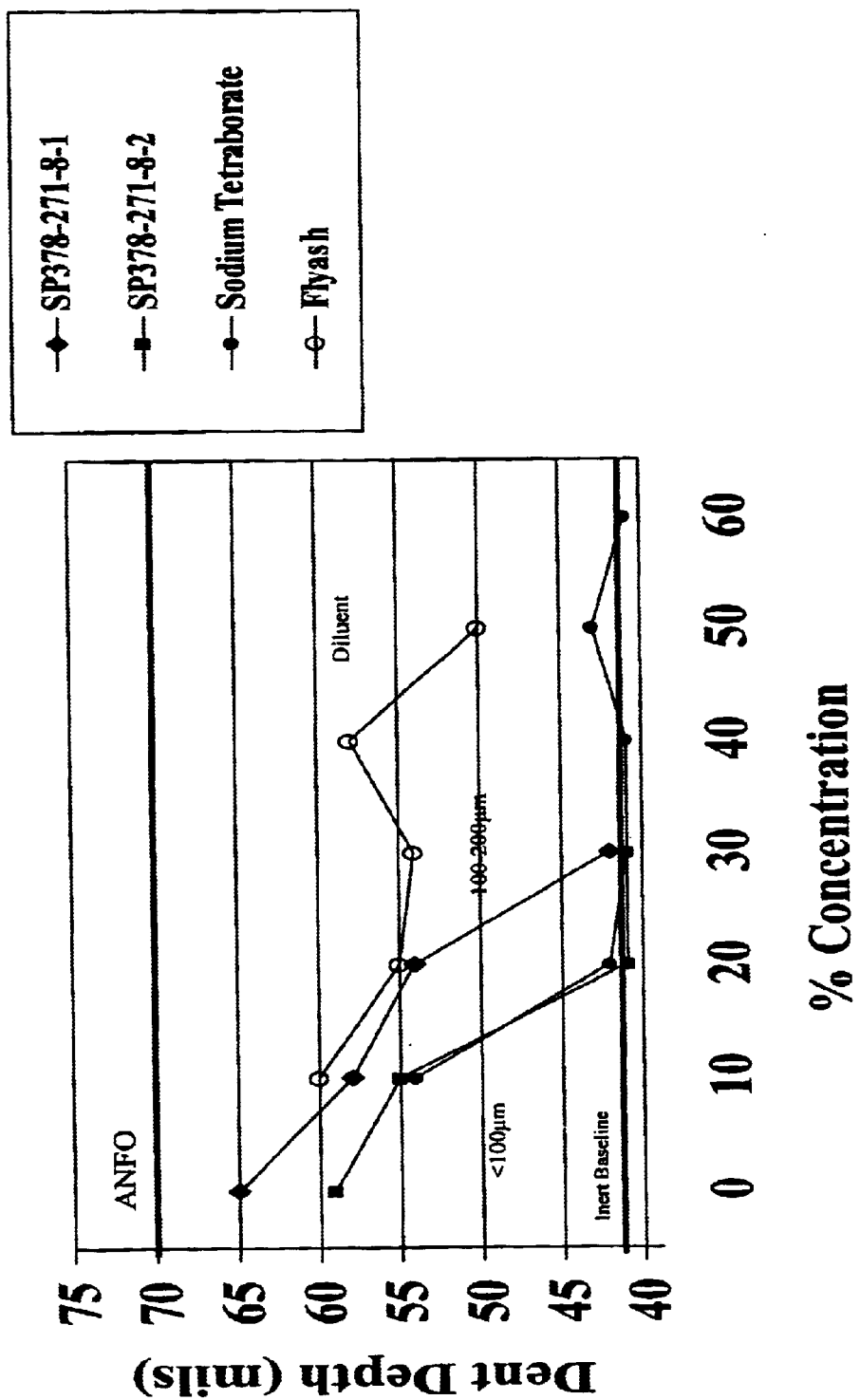
FIG. 2 graphically represents results of a shock reactivity test using different concentrations of candidate ammonium nitrate formulations, sodium tetraborate, and flyash.

The present invention is a method and composition for desensitizing the detonation potential of ammonium nitrate formulations or any other inorganic oxidizing salts which may be used in the production of ANFO. The invention generally includes adding carrier elements containing a suppressant into the composition. The carrier elements are formulated to allow selective release of the suppressant to control the detonation potential. For example, the detonation potential can be controlled by adding an encapsulated suppressant to ammonium nitrate at the time of manufacture, and later activating the suppressant when desired to reduce or entirely eliminate the detonation potential.

The inorganic oxidizing salts useful in the manufacture ANFO include fertilizer grade ammonium nitrate and others as set forth in U.S. Pat. No. 4,637,849 to Harris, Jr., the '849 patent being incorporated herein by reference. These inorganic oxidizing salts may include ammonium, alkali metals and alkaline earth metal nitrates, perchlorates, sulfates and the like. Specific examples of commonly employed salts are ammonium nitrate, ammonium perchlorate, sodium nitrate, sodium perchlorate, potassium nitrate, potassium perchlorate, magnesium nitrate, magnesium perchlorate, calcium nitrate and the like. Mixtures of the foregoing salts can be used. The present invention is applicable to all such inorganic oxidizing salts, albeit the preferred salt is ammonium nitrate.

Ammonium nitrate ($NH_4NO_3$) is a well known and widely used nitric fertilizer. Plants easily absorb ammonium nitrate in their growing period. Prilled ammonium nitrate is a porous pelletized product comprising particles approximately 0.5–2.5 mm in size. When used in the manufacture of ANFO, the porous prills absorb fuel oil. A composition of 94% ammonium nitrate and 6% fuel oil yields the explosive product, ANFO.

In accordance with the method of the present invention, an encapsulated suppressant is added to the porous prilled ammonium nitrate to reduce the detonation potential of ANFO. Preferably, the encapsulated suppressant is in the form of a microballoon. Microballoons are small capsules which range in size from 10–500 μm in diameter. Sizes at the smaller end of this range are preferred because small balloons have a higher surface area-to-volume ratio and release their contents faster than large diameter balloons. The larger surface area allows for more efficient and rapid water release upon rupture in response to a shock wave. The microballoons are incorporated into the porous cavities of the ammonium nitrate prills, and assimilation renders the microballoons difficult to separate from the prills.

The shell of the microballoons is preferably made of sodium silicate or a carbimide resin. An exemplary microballoon is available in powder form from the Chemical Delivery Systems, Inc. of Kettering, Ohio. These microballoons are capable of holding at least 80% water content by weight in the cavity of the capsules. They are resistant to dessication in a dry environment, and they can survive high temperatures (170 C). Other acceptable shell materials include alginates, phospholipids, polysaccharide, cellulose, synthetic polymers, natural gums, waxes, melamine, nylon, saran, zein, polycarbonates, or resins.

The shell material of the microballoons encapsulates a detonation suppressant. The microballoons are sufficiently durable for holding the encapsulated suppressant under normal conditions, yet are fragile enough that they break apart in response to a shock wave passing through the fertilizer. In regard to the latter, the encapsulated suppressant can be selectively released into the ammonium nitrate. This can be accomplished by intentionally exposing the composition to a shock wave, thereby selectively releasing the suppressant and reducing or entirely eliminating the detonation potential.

In the context of the present invention the preferred suppressant or desensitizing agent is water. Inorganic oxygen supplying salts which comprise commercial grade fertilizers are highly water soluble. Water or moisture is known to reduce or eliminate the detonation potential of explosives manufactured from such salts and is known to desensitize ammonium nitrate at concentrations of approximately 10%. Moreover, the above-described microballoons serve well to hold a water content even when mixed with ammonium nitrate, and they withstand light pressure, mixing and hand pressing without releasing their contents. Specifically, the balloons withstand crushing or pressure to 1000 psi, yet release their contents at 5000 psi.

Alternative encapsulated materials may also be used including for example, urea. Urea encapsulated additives require concentrations of approximately 60% (or greater) to reduce the explosive performance of AN/fuel. However, the advantage to adding microencapsulated urea is that urea also acts as a fertilizer, and so is a potentially beneficial additive for AN desensitization despite the unfavorably high concentration requirement.

The encapsulated suppressant as set forth in the foregoing examples is difficult to separate from the ammonium nitrate prills, is environmentally benign when the ammonium nitrate is released for its intended purpose as a fertilizer, and it serves well to selectively reduce or eliminate the detonation potential of explosives manufactured from commercially available sources of inorganic oxidizing salts, such as commercial fertilizers.

In an alternate embodiment hydrated crystals, preferably borax (sodium tetraborate decahydrate), may be used as a means of encapsulation. Hydrated crystals are most effective at a concentration of approximately 40% by weight of the ammonium nitrate, and are mixed into the prills during the prill manufacturing process. Borax is available in a powder form from Fischer Scientific. Other hydrated crystals which are effective encapsulation agents are $MgCl_2.6H_2O$, $Na_2S_2O_3.5H_2O$, $Na_2(H_2SiO_4).95H_2O$, $CaSO_4.2H_2O$, $FeCl_2.4H_2O$, $FeSO_4.7H_2O$.

FIG. 1 is a table listing exemplary microballoons and their design parameters. Each microballoon sample is given a designation listed in the first column. An "SP" prefix indicates that the suppressant is water, and an "RD" prefix indicates that the suppressant is urea. The third column indicates the percent concentration of the suppressant, and the final column indicates approximate size of each sample.

In order to determine which additives are most successful at desensitization or performance reduction, microballoon samples, supplied by Chemical Delivery Systems, Inc., were tested in mixtures of AN/fuel compositions at various concentrations. Two tests were performed—a Small Scale Shock Reactivity Test (SSRT) and a Closed Bomb Test. The following examples will facilitate a more complete understanding of the invention in term of the test results.

EXAMPLE 1

The SSRT test was designed to measure prompt shock reactivity of an acceptor explosive mixture. The SSRT consists of four detonators in four separate holes in a steel confinement apparatus bonded to an aluminum dent block. Candidate AN formulations are placed in each of the steel holes between the detonator and the aluminum dent block. Explosive performance is gauged by measuring the dent depth produced in an aluminum dent block after explosion of the detonator.

The results of the SSRT are shown in FIG. 2, which is a comparison of results for various concentrations of microballoons and borax with AN. The solid line trace shows the performance of diluent (flyash) added to AN as a baseline for comparison. The 100 to 200 µm microballoon samples perform similarly to the diluent until their concentration exceeds 20%. The results tend to baseline when a concentration of 25% microballoon/AN is reached. Sample 272-8-2 performs better as a desensitizer at all concentrations tested than its larger counterpart. The microballoon sample baselines performance at a concentration of 20%. Borax also baselines performance at 20% concentration.

Figure 3:
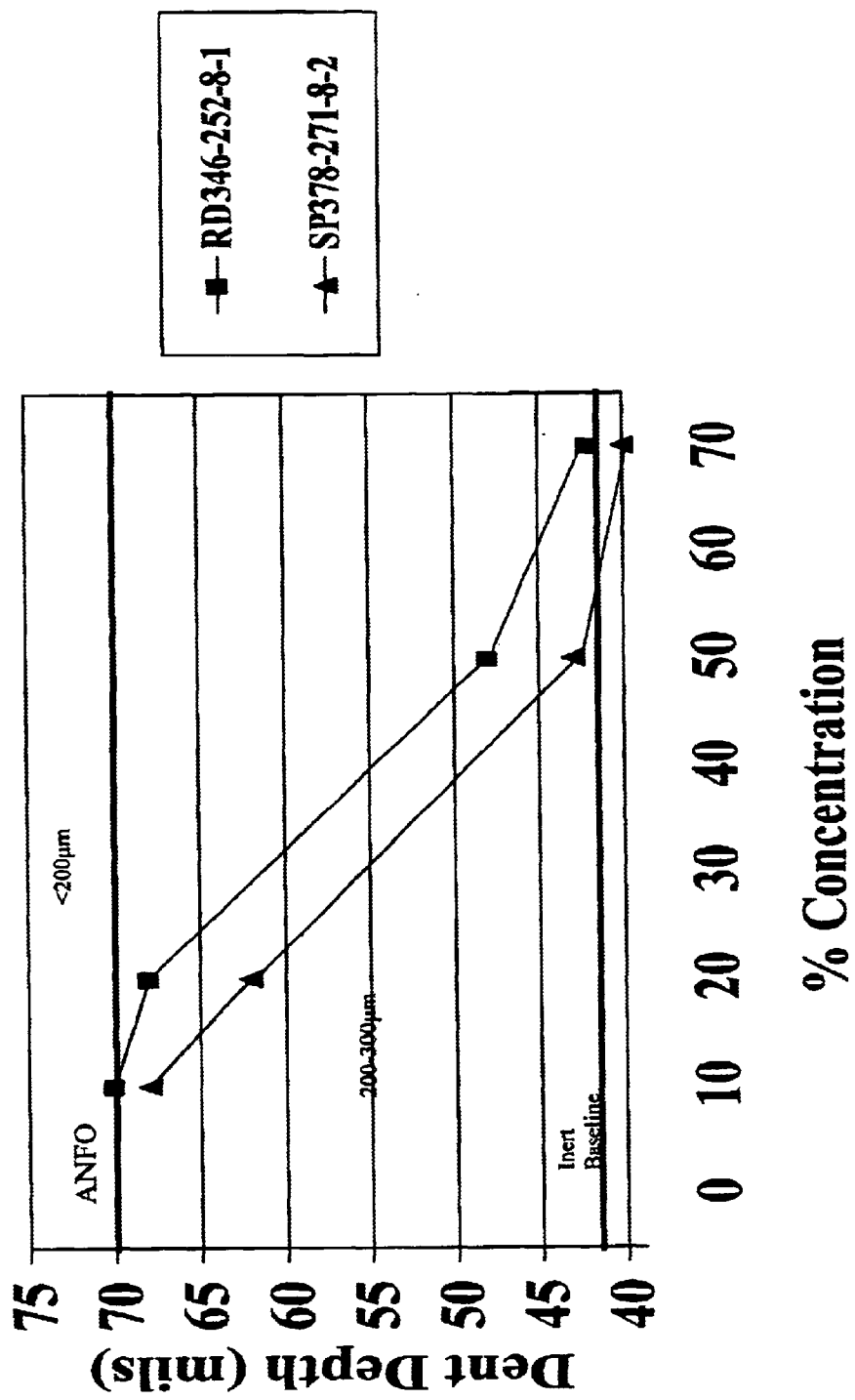
FIG. 3 graphically represents results of a shock reactivity test using different concentrations of urea in urea-filled microballoons.

Results with urea-filed micro-balloons are shown in FIG. 3. Both samples comprise 87% urea by weight. As urea filled microballoon concentrations are raised above approximately 50%, the compositions baseline performance. The performance of these compositions tend to baseline the result to that of the inert material at 70% compositions.

EXAMPLE 2

The water-filled closed bomb apparatus consists of a Stressproof™ 1144 steel body with a 1.5 inch diameter and a 2.72 inch deep cavity. A head piece, with a double O-ring system is inserted in to the bomb body. The piece holds the detonator leads which extend into the cavity. The charge is placed in the water and a clamping cap is screwed onto the body to secure the charge/head assembly into place. Super pressure lines are connected externally to the bomb, one line containing a housing for a transducer to measure pressures at a distance of approximately eight inches away from the charge, and a second line connected to a valve which is opened and closed externally to the firing chamber. The lines are filled with water prior to connecting to the bomb. Pressure external to the bomb is monitored during the experiment by a second transducer mounted in the firing chamber wall. Pressures of up to half a kilobar are maintained in the apparatus for up to 12 hours.

The results of the closed bomb test are shown in are shown in FIG. 4. The first column of Table II gives the shot number, while the second column describes the charge. CB-13a was fired using an RP-80 detonator (delrin sleeve) only, and serves as the baseline for all results. Shot CB-14 contained no microballoons, but used a detonator with a pure 90% AN/10% carbon mixture to simulate ANFO. All subsequent charges (shots CB-15 to CB-22) consisted of a detonator together with AN/C mixed with the microballoon sample listed in the description column. The third column gives the weight of the explosive (mg) contained in each sample. In the fourth and fifth column are values for b and m, which are linear fitting parameters, obtained by fitting the data from 6 to 12 ms to a line.

The column headed P(t) gives the quasi-static pressure within the bomb at the time indicated two lines above it. All values below this are compared with the pressure in the next column headed P-Pdet to provide the residual or excess pressure produced by the explosive charge above that produced by the detonator alone.

The next column gives the weight of each charge normalized to an arbitrary value of 300 mg, which was the total average sample weight in each shot. The P-Pdet column was then divided by these normalized weight values to give a normalized value for the residual pressure produced by each sample. These values are presented in the last column, and can be compared directly to examine the output performance of each sample compared to standard AN/C at 2.03 kpsi.

Figure 5:
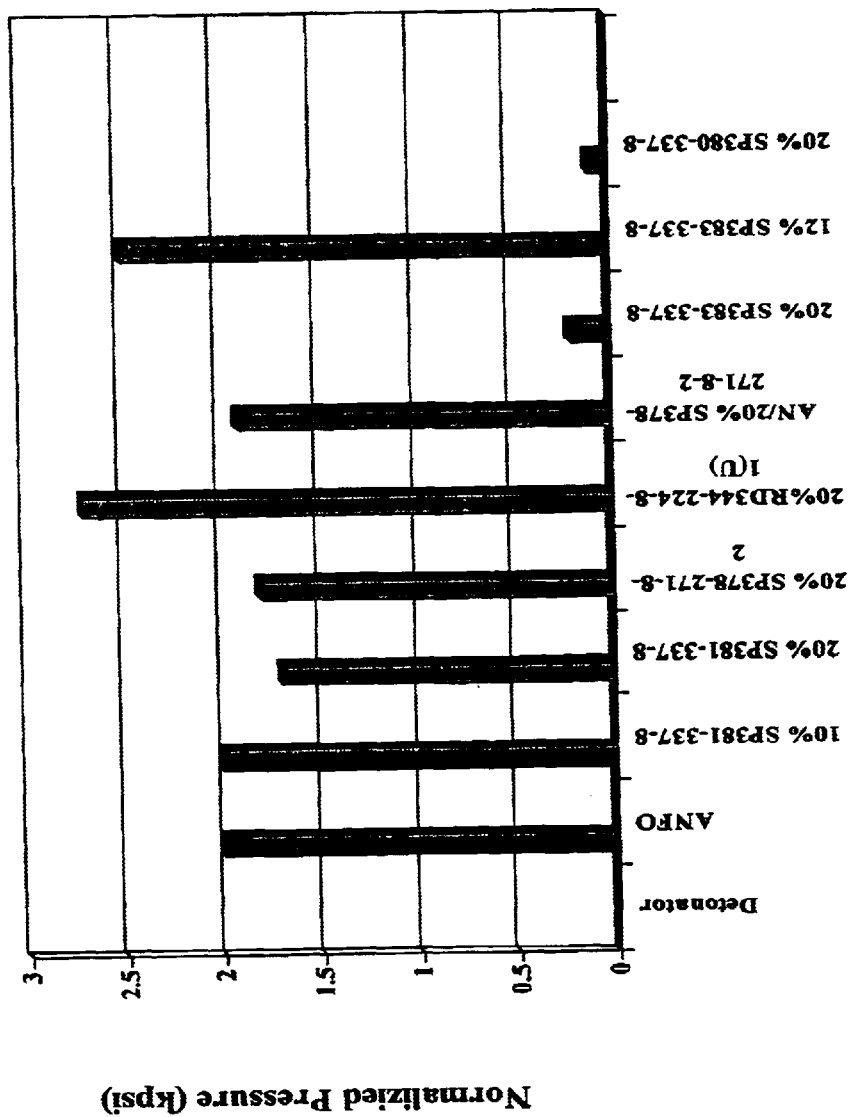
FIG. 5 shows a bar chart of the Pnorm values for each candidate ammonium nitrate formulation.

FIG. 5 shows a bar chart of the Pnorm values for each sample. The chart shows data from a snapshot at 5.5 ms. The detonator serves as the baseline for the charges so it is listed as zero normalized pressure output. Water filled microballoon samples at concentrations of 10% to 12% had a negligible effect on the output performance of the AN/C. The height of the residual pressure bar for 10% SP381-337-8 is the same as the adjacent bar for pure AN/C, indicating that water-filled microballoons at this concentration had no effect on the performance of the AN/C. As microballoon concentrations approached 20%, they significantly reduced the output performance of the AN/C mixture. Twenty percent concentrations of SP381-337-8 and SP378-271-8-2 reduced performance from 2.03 kpsi output for AN/C to approximately 1.6 kpsi, which is the residual pressure produced by the detonator alone.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A composition having a controlled detonation potential, comprising:
   an inorganic oxidizing salt;
   a plurality of discrete particulated carrier elements dispersed in said oxidizing salt and carrier element containing a desensitizing agent;
   whereby said desensitizing agent can be released from said carrier elements to reduce the detonation potential of said composition.

2. The composition having a controlled detonation potential according to claim 1, wherein said inorganic oxidizing salt is prilled, and said plurality of discrete particulated carrier elements comprise microcapsules.

3. The composition having a controlled detonation potential according to claim 1, wherein said desensitizing agent can be selectively released from said carrier elements to reduce the detonation potential of said composition.

4. The composition having a controlled detonation potential according to claim 3, wherein said desensitizing agent can be selectively released from said carrier elements by application of a shock wave to reduce the detonation potential of said composition.

5. The composition having a controlled detonation potential according to claim 2, wherein said prilled inorganic oxidizing salt comprises ammonium nitrate.

6. The composition having a controlled detonation potential according to claim 1, wherein said carrier elements further comprise a plurality of microballoons.

7. The composition having a controlled detonation potential according to claim 6, wherein said microballoons each comprise a generally spherical hollow body having a diameter in the range of about 10–500 $\mu$m, said hollow body comprising an outer shell and an inner hollow chamber for holding said desensitizing agent.

8. The composition having a controlled detonation potential according to claim 1, wherein said carrier elements further comprise a plurality of hydrated crystals.

9. The composition having a controlled detonation potential according to claim 8, wherein said hydrated crystals are selected from the group consisting of sodium tetraborate decahydrate, $MgCl_2.6H_2O$, $Na_2S_2O_3.5H_2O$, $Na_2(H_2SiO_4).95H_2O$, $CaSO_4.2H_2O$, $FeCl_2.4H_2O$, and $FeSO_4.7H_2O$.

10. The composition having a controlled detonation potential according to claim 1, wherein said desensitizing agent is water.

11. The composition having a controlled detonation potential according to claim 1, wherein said desensitizing agent is urea.

12. A method of desensitizing the detonation potential of an explosive compound, comprising the steps of adding a plurality of carrier elements to said explosive compound, said carrier elements each containing a desensitizing agent; and releasing the desensitizing agent from said plurality of carrier elements into said explosive compound to reduce the detonation potential of said compound.

13. The method of desensitizing the detonation potential of an explosive compound according to claim 12, wherein said explosive compound is commercial grade fertilizer.

14. The method of desensitizing the detonation potential of an explosive compound according to claim 13, wherein said commercial grade fertilizer is ammonium nitrate.

15. The method of desensitizing the detonation potential of an explosive compound according to claim 12, wherein said step of releasing the desensitizing agent further comprises applying a shock wave to said explosive compound to release said desensitizing agent into said explosive compound, thereby saturating said compound and diminishing its detonation potential.

16. The method of desensitizing the detonation potential of an explosive compound according to claim 12, wherein said step of adding a plurality of carrier elements further comprises adding a plurality of microcapsules each containing a desensitizing agent to said compound.

17. The method of desensitizing the detonation potential of an explosive compound according to of claim 16, wherein said microcapsules each comprise a generally spherical hollow body having a diameter in the range of 10–500 $\mu$m, said hollow body comprising an outer shell and an inner hollow chamber for holding said desensitizing agent.

18. The method of desensitizing the detonation potential of an explosive compound according to claim 12, wherein said step of adding a plurality of carrier elements further comprises adding a plurality of hydrated crystals selected from the group consisting of sodium tetraborate decahydrate, $MgCl_2.6H_2O$, $Na_2S_2O_3.5H_2O$, $Na_2(H_2SiO_4).95H_2O$, $CaSO_4.2H_2O$, $FeCl_2.4H_2O$, and $FeSO_4.7H_2O$.

19. The method of desensitizing the detonation potential of an explosive compound according to claim 12, wherein said desensitizing agent is any one from among the group consisting of water and urea.

20. A particulated additive for desensitizing the detonation potential of explosive compositions, comprising:

a carrier element comprising any one from among the group of microballoons and hydrated crystals; and a desensitizing agent contained within said carrier elements and selectively released therefrom for saturating said explosive composition in response to a shock wave passing through the composition.

* * * * *